(12) United States Patent
Suzuki et al.

(10) Patent No.: US 7,795,338 B2
(45) Date of Patent: Sep. 14, 2010

(54) BAKING-DRYING WATER DAMPING PAINT COMPOSITION

(75) Inventors: Haruhisa Suzuki, Toyota (JP); Toshimichi Hiraki, Nishikasugai-gun (JP); Akira Nonoyama, Chiryu (JP); Yutaka Ohashi, Nisshin (JP); Hidenori Nagaoka, Toyota (JP)

(73) Assignees: Aisin Kako Kabushiki Kaisha, Nishikamo-gun (JP); Toyota Jidosha Kabushiki Kaisha, Toyota-shi (JP)

( * ) Notice: Subject to any disclaimer, the term of this patent is extended or adjusted under 35 U.S.C. 154(b) by 721 days.

(21) Appl. No.: 11/489,689

(22) Filed: Jul. 20, 2006

(65) Prior Publication Data

US 2006/0258790 A1   Nov. 16, 2006

Related U.S. Application Data

(63) Continuation of application No. 10/483,260, filed as application No. PCT/JP03/01085 on Feb. 3, 2003, now abandoned.

(30) Foreign Application Priority Data

Feb. 4, 2002   (JP) ................ 2002-27281

(51) Int. Cl.
*C08K 3/00* (2006.01)
*C08L 9/06* (2006.01)

(52) U.S. Cl. .............. 524/401; 524/423; 524/424; 524/425; 524/442; 524/448; 524/449; 524/450; 524/451; 524/526; 524/575

(58) Field of Classification Search ............. 524/501, 524/401, 442, 526
See application file for complete search history.

(56) References Cited

U.S. PATENT DOCUMENTS

| 5,424,355 A | 6/1995 | Uemae et al. |
| 5,731,377 A | 3/1998 | Friel |
| 6,248,806 B1 | 6/2001 | Codolar et al. |

FOREIGN PATENT DOCUMENTS

| DE | 33 43 728 | 6/1984 |
| EP | 0 297 781 | 1/1989 |
| EP | 0953 601 | 11/1999 |
| JP | 5-255634 | 5/1993 |
| JP | 5-194906 | 8/1993 |
| JP | 5-331390 | 12/1993 |
| JP | 8-209056 | 8/1996 |
| JP | 9-151353 | 6/1997 |
| JP | 10-183017 | 7/1998 |
| JP | 10-204370 | 8/1998 |
| JP | 2000-160059 | 6/2000 |
| JP | 2000-178498 | 6/2000 |
| JP | 2000-178499 | 6/2000 |
| JP | 2000345493 A * | 12/2000 |
| JP | 2003-193025 | 7/2003 |
| WO | 94/11452 | 5/1994 |

OTHER PUBLICATIONS

Brandrup, J. Polymer Handbook, 4th Edition, pp. VI/194-VI/197, 1999. ISBN 0-471-16628-6.*
Machine translation of JP 2000-345493 A, Dec. 12, 2000.*
English-language translation of JP 09-151335 A, Jun. 10, 1997.

* cited by examiner

*Primary Examiner*—Vickey Nerangis
(74) *Attorney, Agent, or Firm*—Oblon, Spivak, McClelland, Maier & Neustadt, L.L.P.

(57) ABSTRACT

A baking-drying water damping paint composition from which heavy film-thickness damping paint films can be obtained, heavy film-thickness damping paint films, in which an inorganic filler is filled into the resinous component of paints to higher extent, and which are free from the occurrence of cracks and swelling in the paint films when the paint films are baked and dried.

9 Claims, No Drawings

BAKING-DRYING WATER DAMPING PAINT COMPOSITION

CROSS REFERENCE TO RELATED APPLICATIONS

This application is a continuation of U.S. patent application Ser. No. 10/483,260, filed Mar. 23, 2004, which is a 371 of PCT/JP03/01085, and claims priority to Japan patent application No. 2002/27281, filed Feb. 4, 2002, both of which are incorporated by reference in their entirety.

BACKGROUND OF THE INVENTION

1. Technical Field

The present invention relates to a baking-drying water damping paint composition which is a water paint composition into which an inorganic filler is filled to higher extent, and which can form stable and heavy thickness cured paint films by baking.

2. Background Art

Conventionally, sheet-shaped damping members, such as asphalt sheets, have been used in automotive body floors, doors, dashboards, and the like, in order to give them a damping property. Moreover, coating water damping paints, which are adapted for automatically coating with robots and so forth, have been developed recently. However, in the case of ordinary damping paints, since the specific gravity of the resulting paint films is smaller than that of asphalt sheets, it is necessary to further thicken the film thickness, and accordingly there is fear that such problems might arise in that they interfere with the other component parts, form steep irregularities on body floors, and so on. In addition, damping paints are yet highly expensive at present.

As a method to solve the problems, it is possible to think of enhancing the specific gravity of paints by heightening the filling ratio of inorganic fillers into paints, however, when inorganic fillers are filled to higher extent, cracks are likely to occur in the resulting paint films in baking and drying. As a result, there is a problem in that the paint films come off from the substrates to be coated because of the poor adhesion to the substrates to be painted, and it is thus impossible at present to fully effect the performance of paint films with inorganic fillers filled to higher extent.

In Japanese Unexamined Patent Publication (KOKAI) No. 8-209, 056, there is a disclosure on an ordinary-temperature drying water emulsion paint which is good in terms of the adhesion to undercoatings and the damping property. In the paint, 3 kinds of denatured resins, such as (a) a partially cross-linked acrylic resin whose gel ratio is from 10 to 90% by weight, (b) a carboxyl denatured styrene-butadiene rubber and (c) a styrene denatured acrylic resin, are mixed to use them at the same time, and it is considered preferable to compound an inorganic filler in an amount of from 150 to 250 parts with respect to 100 parts of the resinous content.

The paint is an ordinary-temperature drying one, and requires drying at room temperature for 72 hours in order to obtain a paint film whose film thickness is 5000 μm in the examples. When it is baked at higher temperatures in order make the drying faster, it is assumed that a drawback arises in that no normal paint films can be obtained because cracks, swelling and the like occur.

In Japanese Unexamined Patent Publication (KOKAI) No. 9-151,335, a water damping paint is disclosed which includes an inorganic filler in an amount of from 250 to 550 parts by weight and both or either one of a thickening agent and a dispersing agent in an amount from 0.3 to 35 parts by weight with respect to 100 parts by weight of the solid content of a synthetic resin emulsion whose major component is a synthetic resin exhibiting a glass transition temperature of from −50° C. to 5° C. The paint was dried at room temperature in the examples. Nothing is set forth on the gel ratio of the synthetic resin.

In Japanese Unexamined Patent Publication (KOKAI) No. 5-194, 906, there is a disclosure on a composition for water coating, composition which comprises polymer fine particles, dispersed in a water medium, and an inorganic filler. The polymer fine particles are made of two kinds of polymer fine particles, i.e., synthetic rubber emulsion polymer particles whose glass transition temperature is 0° C. or less and emulsion polymer particles whose glass transition temperature is 20° C. or more. Regarding the compounding amount of the inorganic filler into the paint resin, a possibility of such a high compounding amount is disclosed that it can preferably fall in a range of from 120 to 380 parts by weight with respect to 100 parts by weight of the resinous content. However, it is considered appropriate that the thickness of the paint falls in a range of from 200 to 800 μm, and when it is adapted for compositions to be baked at elevated temperatures, it is recommended to carry out 2-stage drying in which it is dried preliminarily at a temperature of from 60 to 100° C. and is thereafter baked at a temperature of from 120 to 160° C.

With the composition for water coating, it is difficult to overcome the drawback that cracks and swelling are likely to occur when paint films, which are applied in a heavy thickness, are baked and dried at high temperatures in one stage. The swelling limit of the paint films obtained in the examples was as thin as from 400 to 1,200 μm, and accordingly it is not possible to obtain heavy thickness paint films which are needed to obtain a damping property.

In Japanese Unexamined Patent Publication (KOKAI) No. 2000-160, 059, there is a disclosure on a water emulsion paint which comprises a water emulsion resin whose gel ratio is from 93 to 97% in an amount of from 20 to 50 parts by weight, and whose a baking temperature is from 70 to 130° C. However, in the paint, since the resin is used which exhibits such a high gel ratio, an inorganic filler is compounded so that calcium carbonate, a filler, is compounded in an amount of 40% by weight at the highest with respect to 30% by weight of the resin as set forth in the examples, and thus the content of the inorganic filler is about 1.3 times the content of the resin at the highest. Since the resinous content exhibits a high gel ratio so that the cross-linking density is enhanced therein, it is impossible to hold the filler in the resin when the inorganic filler is filled in the resin in a double amount or more of the resin, and accordingly cracks, swelling, and the like, occur, and consequently it is difficult to obtain satisfactory paint films.

When inorganic fillers are compounded in baking-drying water paints as described above, in the water paints disclosed conventionally, since there is a fear for cracked paints which are caused by the volumetric contraction of paint films, volumetric contraction which is accompanied by the evaporation of the water content within paints under baking-temperature conditions where the drying of ordinary paint films is carried out, it has been usual practices to dry paints mostly in a low temperature range to make cured paint films, or to decrease the compounding amount of inorganic fillers, or further to simultaneously use special denatured resins in combination. In particular, when inorganic fillers are filled to higher extent in order to reduce costs involved, there is a problem in that the phenomena, such as cracked paint films and swollen paint films, arise remarkably in drying the aforementioned resinous components.

The present invention has been done in view of the aforementioned circumstances, and it is an assignment to propose a baking-drying water damping paint composition, in which an inorganic filler is filled into the resinous component of paints to higher extent, and from which heavy thickness paint films being free from the occurrence of cracks and swelling in baking and drying the paint films can be obtained, in the field of baking-drying water paints.

SUMMARY OF THE INVENTION

A baking-drying water damping paint composition according to the present invention comprises: a water emulsion including at least one first granular resin selected from the group consisting of styrene-butadiene copolymers, acrylic ester copolymers and ethylene-vinyl acetate copolymers whose glass transition temperature is from 0 to 20° C. and gel ratio is from 60 to 80%; and an inorganic filler in an amount of 200 parts by weight or more with respect to 100 parts by weight of said first granular resin.

Another baking-drying water damping paint composition according to the present invention comprises: a water emulsion including at least one first granular resin selected from the group consisting of styrene-butadiene copolymers, acrylic ester copolymers and ethylene-vinyl acetate copolymers whose glass transition temperature is from 0 to 20° C. and gel ratio is from 60 to 80%, and at least one second granular resin selected from the group consisting of styrene-butadiene copolymers, acrylic ester copolymers and ethylene-vinyl acetate copolymers whose glass transition temperature is from 25 to 60° C.; and an inorganic filler in an amount of 200 parts by weight or more with respect to the sum of said first granular resin and said second granular resin taken as 100 parts by weight.

The present inventors found out that cracks occur in baking and drying so that it is less likely to obtain heavy thickness paint films whose thickness is 3 mm or more when the gel ratio of the water emulsion including at least one first granular resin selected from the group consisting of styrene-butadiene copolymers, acrylic ester copolymers and ethylene-vinyl acetate copolymers is higher beyond 80%, and that swelling occurs in baking and drying so that it is less likely to obtain heavy thickness paint films whose thickness is 3 mm or more when the gel ratio of the water emulsion is less than 50% contrarily. Moreover, the inventors found out that, even when the gel ratio falls in a range of from 60 to 80%, cracks or swelling occurs in baking and drying so that it is less likely to obtain heavy thickness paint films whose thickness is 3 mm or more when the glass transition temperature of the first granular resin is lower than 0° C. or when it is higher beyond 20° C. contrarily.

In addition, when a water emulsion is used which includes at least one first granular resin selected from the group consisting of styrene-butadiene copolymers, acrylic ester copolymers and ethylene-vinyl acetate copolymers whose glass transition temperature is from 0 to 20° C. and gel ratio is from 60 to 80%, and at least one second granular resin selected from the group consisting of styrene-butadiene copolymers, acrylic ester copolymers and ethylene-vinyl acetate copolymers whose glass transition temperature is from 25 to 60° C., the present inventors found out that it is possible to obtain paint films which have a heavy thickness equal to or more than the instance that a water emulsion is formed of the first granular resin alone.

The present baking-drying water damping paint composition has been completed based on the discoveries and knowledge.

Said inorganic filler can preferably be at least one member selected from the group consisting of calcium carbonate, talc, diatomaceous earth, barium sulfate, zeolite, magnesium carbonate and mica.

It comprises said inorganic filler in an amount of 200 parts by weight or more with respect to 100 parts by weight of said first granular resin. The upper limit can preferably be 600 parts by weight approximately.

Moreover, the present baking-drying water damping paint composition can preferably be such that the drying-and-baking temperature falls in a range of from 70 to 160° C.

In the present invention, by using water emulsion particles whose gel ratio is controlled in the specific range, it is possible to obtain stable cured paint films which are free from the occurrence of cracks and swelling even when the inorganic filler is filled to higher extent and further the paint films are dried at ordinary baking temperatures.

Moreover, since the paint composition can enhance the specific gravity of paint films by enlarging the compounding amount of the inorganic filler, the thickness can be reduced compared with that of conventional damping paints. In addition, since it is possible to utilize inexpensive inorganic fillers, it is possible to achieve reducing the costs of damping paints so that it becomes a useful baking-drying water paint composition.

MODE FOR CARRYING OUT THE INVENTION

The present baking-drying water damping paint composition is characterized in that it can be baked and cured, and in that the inorganic filler can be compounded to higher extent. And, the first granular resin, water emulsion particles making the resinous component of the paint composition, is composed of at least one member selected from the group consisting of styrene-butadiene copolymers, acrylic ester copolymers and ethylene-vinyl acetate copolymers whose glass transition point (Tg) falls in a range of from 0 to 20° C. Then, the first granular resin is characterized in that it is the resinous component whose gel ratio, an index of the cross-linking density, falls in a range of from 60 to 800.

Moreover, the other present baking-drying water damping paint composition uses a water emulsion in which the first granular resin is mixed with the second granular resin selected from the group consisting of styrene-butadiene copolymers, acrylic ester copolymers and ethylene-vinyl acetate copolymers whose glass transition temperature (Tg) falls in a range of from 25 to 60° C.

It is necessary for the gel ratio to fall in a range of from 60 to 80% in order that the inorganic filler is filled into the paint composition to higher extent so as to form satisfactory dried paint films under ordinary baking temperature conditions. When the gel ratio exceeds 800, and when the inorganic filler is filled in a greater amount, it is not preferable because cured paint films are brittle so that cracks occur in paint films. On the other hand, when the gel ratio is less than 600, it is not preferable because the strength of paint films is not sufficient in baking and drying so that they cannot withstand the rapid evaporation of the water and swelling occurs in paint films.

Moreover, when the second granular resin whose glass transition temperature (Tg) falls in a range of from 25 to 60° C. is mixed in an amount of from 15 to 60% with respect to the first granular resin, it is possible to promote the evaporation of the water content in initial baking and drying so that the swelling of paint films is improved more in baking and drying, and accordingly it is possible to obtain cured paint films provided with a good damping property and free from the occurrence of cracks and swollen paint films even in baking and drying paint films with such an extremely heavy thickness as 8 mm in thickness. Note that the mixing of the first granular resin and second granular resin can be prepared with ease by mixing each one of first granular resin emulsions and second granular resin emulsions.

When the mixing amount of the second granular resin exceeds 600 of the sum of the first granular resin and second granular resin taken as 1000, or when the glass transition temperature (Tg) of the second granular resin exceeds 60° C., the formation of paint films is slow in baking and drying so that paint films become brittle and cracks are likely to occur. Moreover, when the compounding proportion of the second granular resin is less than 200, or when the glass transition temperature (Tg) is less than 25° C., the action of promoting the evaporation of the water content is insufficient in initial baking and drying so that the swelling of paint films is likely to occur in paint films with such an extremely heavy thickness as 8 mm in thickness.

The first granular resin and second granular resin can be such that at least one or two members of styrene-butadiene copolymers, acrylic ester copolymers and ethylene-vinyl acetate copolymers are mixed to use, or, depending on cases, three of them are mixed to use. The styrene-butadiene copolymers can preferably contain butadiene in an amount of from 30 to 40% by weight at least. As for the acrylic ester copolymers, it is possible to utilize copolymers which are made from two or more monomers selected from the group consisting of methyl acrylate, ethyl acrylate, propyl acryl ate, butyl acryl ate, 2-ethylhexyl acryl ate, 2-hydroxyethyl acrylate, methyl methacrylate, ethyl methacrylate, glycidyl acrylate, and the like. The ethylene-vinyl acetate copolymers can preferably be such that vinyl acetate is included in an amount of from 40 to 50% by weight at least.

Moreover, in order to compound the inorganic filler to higher extent, it is preferred that the resinous component can be included in the emulsion in a concentration of from 40 to 60% by weight because the paintability is sustained and paint films which exhibit satisfactory paint-film physical properties are formed after painting.

Since the resinous component in the water emulsions is provided with the characteristics described above, it is possible to hold the inorganic filler even when the inorganic filler is compounded in the water emulsions abundantly, and to let the sufficient paint-film performance reveal under ordinary baking-temperature conditions, namely, at a baking temperature of from 70 to 160° C.

The gel ratio designates the cross-linking density in resin, is a measured value which designates how much insoluble components exist when resin is immersed in solvent, and can be calculated by the following equation {(Weight of Dried Resin after being Extracted with Solvent)/(Weight of Resin before being Extracted with Solvent)}×100

Specifically, the weight of the paint film which forms the dried paint film of the water emulsion resin is measured, the paint film is immersed in a solvent (for example, toluene), which can solve the resin, for a predetermined period of time, and the resinous paint film is thereafter dried at a predetermined temperature to measure the weight, and then the gel ratio is calculated by the above-describe equation.

In the present paint composition, the water emulsion resin whose gel ratio is from 60 to 80% can be prepared in general in the following manner. For example, when SBR is exemplified, SBR can be obtained generally by subjecting styrene (S), butadiene (B), unsaturated carboxylic acid and the other monomers to emulsion polymerization in the presence of an emulsifier. In the course of the emulsion polymerization, the water emulsion resin whose gel ratio is from 60 to 80% can be prepared by adding a chain transfer agent (underwater addition).

Note that it is possible to control the gel ratio by adjusting the content of a cross-linking agent or a polymerization initiator along with the addition of a chain transfer agent. The water emulsion resin, the present first granular resin, exhibits a glass transition point (Tg) falling in a range of from 0 to 20° C. Moreover, the water emulsion resin, the present second granular resin, exhibits a glass transition point (Tg) falling in a range of from 25 to 60° C.

Regarding the Tg as well, when SBR is exemplified likewise, it is possible to obtain resins having a desired Tg by adjusting the contents of styrene and butadiene.

In the case where a styrene-butadiene copolymer, an acrylic ester copolymer and an ethylene-vinyl acetate copolymer are used in combination, it is possible to carry out the forming by mixing their water emulsions which are synthesized independently.

As for the inorganic filler to be compounded, at least one or more members selected from the group consisting of calcium carbonate, talc, diatomaceous earth, barium sulfate, zeolite, magnesium carbonate and mica are used. The compounding proportion into the paint composition is 200 parts by weight or more, preferably from 200 parts by weight to 600 parts by weight, further preferably from 200 to 400 parts by weight, with respect to 100 parts by weight of the resinous content.

When the compounding proportion of the inorganic filler is less than 200 parts by weight, it is not preferable because it cannot be turned into the present paint films in which the inorganic filler is filled to higher extent. The upper limit of the compounding proportion of the inorganic filler can be allowed up to 600 parts by weight, however, can preferably be from 200 to 400 parts by weight approximately in order to make satisfactory paint films.

Moreover, in order to uniformly disperse and fill the inorganic filler to sustain the strength of paint films, it is preferable to use the inorganic filler whose average particle diameter is 50 µm or less. When the average particle diameter is 50 µm or less, the dispersibility is enhanced in paint films to heighten the strength of paint films in baking, so that it is possible to inhibit the occurrence of cracks and swelling.

In addition, when inorganic short fibers, such as wollastonite and whisker-shaped calcium carbonate, for example, whose fibrous length is from 100 µm to 1 mm are filled as the inorganic filler in an amount of from 30 to 100 parts by weight, it is possible to obtain satisfactory paint films which are free from cracks and swelling, however, it is necessary to care in order that clogged nozzles do not occur in discharging.

It is possible to adjust the qualities, such as the viscosity, for painting operations by compounding the paint composition with the other known additives, such as a defoaming agent, a dispersing agent, a thickening agent and a running inhibitor agent.

The mixing of the paint composition can be carried out with high-speed dispersers which can stir and disperse it at a high speed, and accordingly it is possible to make pints having a viscosity and concentration which are appropriate for painting operations.

The painting can be carried out with spraying guns for ordinary spray painting, or by airless spraying methods.

Depending on the thickness, paint films coated on substrates to be painted are usually baked and cured at a temperature of from 70° C. to 160° C. for from 5 to 30 minutes. Even when being dried under the baking temperature condition, no cracks, swelling, and the like, occur in the relatively heavy thickness paint films so that it is possible to form paint films, in which the inorganic filler is filled to higher extent, with ease. Note that the thickness of wet paint films before baking and the thickness of dried pained films after baking are identical substantially. The lower the baking temperature is, the thinner the thickness of dried paint films tends to be. It is believed that fine bubbles are dispersed in paint films when being baked at elevated temperatures.

The present dried paint films exhibit an enhanced specific gravity because the filling extent of the inorganic filler is high, and accordingly can be used as damping paint films. Moreover, it is possible to reduce the costs as damping paints, because inexpensive inorganic fillers can be compounded into paint films.

EXAMPLES

Hereinafter, it will be described specifically with reference to examples.

Example No. 1

In the present example, a styrene-butadiene resin (SBR, Tg: 5° C. and a gel ratio of 80%) whose butadiene content was 35% was used as a first granular resin, and an emulsion containing the resin in amount of 55% by weight was used. Into the emulsion, calcium carbonate (an average particle diameter of 20 μm) as an inorganic filler, and a dispersing agent, a running inhibitor agent, and the like, were compounded as additives in a predetermined amount, thereby preparing a paint composition recited in Table 1. Note that, as for the inorganic filler (calcium carbonate), those into which it was compounded in an amount of 200 parts by weight and 400 parts by weight with respect to 100 parts by weight of the granular resin were prepared.

Example No. 1

Instead of the first granular resin of Example No. 1, a styrene-butadiene resin whose Tg was 5° C. and gel ratio was 70% was used. The other components are the same as those of Example No. 1.

Example No. 2

Instead of the first granular resin of Example No. 1, a styrene-butadiene resin whose Tg was 5° C. and gel ratio was 60% was used. The other components are the same as those of Example No. 1.

Comparative Example No. 1

Instead of the first granular resin of Example No. 1, a styrene-butadiene resin whose Tg was 5° C. and gel ratio was 90% was used. The other components are the same as those of Example No. 1.

Comparative Example No. 2

Instead of the first granular resin of Example No. 1, a styrene-butadiene resin whose Tg was 5° C. and gel ratio was 50% was used. The other components are the same as those of Example No. 1.

Table 1 sets forth the compounding composition of the respective paint compositions. Note that, in Table 1, they are designated as parts by weight of the water emulsion including water in an amount of 45%.

After the aforementioned respective compositions thus compounded were mixed by a high-speed stirrer to disperse, they were stirred to defoam, and were used as paints for application.

The paints were applied to a 70×150×0.8 (mm) electrodeposition-coated steel plate so as to be 50×150×3.0 (mm), immediately after the application, they were put in a drying oven, whose temperature was controlled at 140° C., for 30 minutes to carry out baking and drying. After the drying, the appearance of the paint films was observed, and the paint films free from cracks and swelling were regarded as being passed (O). Table 1 sets forth the results.

As recited in Table 1, in Example Nos. 1 through 3 whose water emulsion particles (first granular resin) exhibited a gel ratio falling in a range of from 80% to 60%, paint films in which the inorganic filler was compounded in an amount of 200 parts by weight and 400 parts by weight with respect to 100 parts by weight of the water emulsion (55 parts by weight of the first granular resin) could form normal paint films when being baked at such a high temperature as 140° C.

However, in Comparative Example No. 1 whose water emulsion particles exhibited such a high a gel ratio as 90%, cracks occurred in both cases where the inorganic filler amount was 400 parts by weight and 200 parts by weight. In Comparative Example No. 2 whose water emulsion particles exhibited such a low a gel ratio as 50%, the strength of the paint films was not sufficient so that swelling occurred in both cases where the inorganic filler amount was 400 parts by weight and 200 parts by weight, and they thus did not become normal paint films.

Therefore, when the gel ratio of the water emulsion particles falls in a range of from 80% to 60%, it is understood that, in paint films in which an organic filler is filled to higher extent and whose thickness is 6 mm (after being dried), paints can withstand the high-temperature baking at 140° C. for 30 minutes.

Moreover, on the samples from which the normal paint films were obtained, the damping property (loss factor) by means of a cantilever method was measured. As for the measurement of the damping property (loss factor), they were applied to a 10×220×0.8 (mm) steel plate so as to be 10×200×3.0 in superficial density (after being dried), and were put in a drying oven, whose temperature was controlled at 140° C., for 30 minutes to carry out baking and drying. After drying, the coated plates were used as test plates for assessment, and were examined by a cantilever method so as to calculate the loss factor at the secondary resonance point by a half-width method. Table 1 sets forth the results together with the measurement conditions. Since all of the paint films exhibited a loss factor of 0.1 or more, it is understood that they were good as a paint film and could secure stable performance at a measurement temperature of from 20° C. to 40° C.

From the results, in the present water paint composition, it is possible to confirm that heavy thickness paint films can be obtained even under the high-temperature baking-drying condition.

Comparative Example No. 3

In the comparative example, a styrene-butadiene resin whose glass transition temperature Tg was −5° C., gel ratio was 90% and butadiene content was 43% was used, and an emulsion containing the resin in amount of 55% by weight was used. Into the emulsion, calcium carbonate (an average particle diameter of 20 μm) as an inorganic filler, and a dispersing agent, a running inhibitor agent, and the like, were compounded as additives in a predetermined amount, thereby preparing a paint composition recited in Table 2. Note that, as for the inorganic filler (calcium carbonate), those into which it was compounded in an amount of 200 parts by weight and 400 parts by weight with respect to 100 parts by weight of the SBR were prepared.

Comparative Example No. 17

Instead of the SBR of Comparative Example No. 3, a styrene-butadiene resin whose Tg was −5° C., gel ratio was 80% and butadiene content was 43% was used. The other components are the same as those of Comparative Example No. 3. Table 2 sets forth the specific composition.

Comparative Example No. 5

Instead of the SBR of Comparative Example No. 3, a styrene-butadiene resin whose Tg was −5° C., gel ratio was 60% and butadiene content was 43% was used. The other components are the same as those of Comparative Example No. 3. Table 2 sets forth the specific composition.

Comparative Example No. 6

Instead of the SBR of Comparative Example No. 3, a styrene-butadiene resin whose Tg was 30° C., gel ratio was 80% and butadiene content was 28% was used. The other components are the same as those of Comparative Example No. 3. Table 2 sets forth the specific composition.

Comparative Example No. 7

Instead of the SBR of Comparative Example No. 3, a styrene-butadiene resin whose Tg was 30° C., gel ratio was 60% and butadiene content was 28% was used. The other components are the same as those of Comparative Example No. 3. Table 2 sets forth the specific composition.

Comparative Example No. 8

Instead of the SBR of Comparative Example No. 3, a styrene-butadiene resin whose Tg was 30° C., gel ratio was 50% and butadiene content was 28% was used. The other components are the same as those of Comparative Example No. 3. Table 2 sets forth the specific composition.

After the aforementioned respective compositions thus compounded were mixed by a high-speed stirrer to disperse, they were stirred to defoam, and were used as paints for application.

The paints were applied to a 70×150×0.8 (mm) electrodeposition-coated steel plate so as to be 50×150×3.0 (mm), immediately after the application, they were put in a drying oven, whose temperature was controlled at 140° C., for 30 minutes to carry out baking and drying. After the drying, the appearance of the paint films was observed, and the paint films free from cracks and swelling were regarded as being passed (O). Table 2 sets forth the results.

As recited in Table 2, when the SBRs making the water emulsion particles exhibited a glass transition temperature Tg of −5° C. or 30° C., no paint films which were free from defects and whose thickness was as heavy as 5.0 mm were not obtained in all of the SBRs. In Comparative Example No. 4, Comparative Example No. 5 and Comparative Example No. 8, 3.0 mm and 4.0 mm paint films which were free from defects were obtained. Even when the glass transition temperature Tg of the SBRs was −5° C. or 30° C., outside the range of from 0 to 20° C., it is understood that satisfactory paint films whose thickness was from 3 to 4 mm approximately were obtained if the gel ratio was appropriate or if the compounding proportion of the inorganic filler was less.

On the samples from which the normal paint films were obtained, the damping property (loss factor) by means of the cantilever method was measured. Table 2 sets forth the results together with the measurement conditions. Since all of the paint films exhibited a loss factor of 0.1 or less depending on the measurement temperatures, it is understood that they could not secure stable performance as a paint film.

From the results, even when the gel ratio of the water emulsion particles falls in a range of from 60% to 800, it is understood that, if the glass transition temperature falls outside the range of from 0 to 20° C., not only it is less likely to obtain satisfactorily heavy thickness paint films, but also the temperature range in which a good damping property is exhibited is narrow even if they should be obtained.

Example No. 4

A water emulsion was obtained by mixing a water emulsion, containing a styrene-butadiene resin (SBR and Tg: 5° C.) whose gel ratio was 80% and butadiene content was 35% in an amount of 55% by weight, in an amount of 80 parts by weight as a granular resin with another water emulsion, containing a styrene-acrylic ester copolymer whose gel ratio was 10% and Tg was 50° C., in an amount of 20 parts by weight as another granular resin. A paint composition was labeled as Example No. 4 in which an inorganic filler (calcium carbonate) was compounded in an amount of 400 parts by weight and a dispersing agent and a running inhibitor agent were compounded in a summed amount of 20 parts by weight into the resulting water emulsion.

Example No. 5

The compounding proportions of the granular resins of Example No. 4 were changed so that an emulsion was used which was obtained by mixing a water emulsion, containing a styrene-butadiene resin (SBR and Tg: 5° C.) whose gel ratio was 80% and butadiene content was 35% in an amount of 55% by weight, in an amount of 50 parts by weight as a granular resin with another water emulsion of a styrene-acrylic ester copolymer whose gel ratio was 10% and Tg was 50° C. in an amount of 50 parts by weight as another granular resin. The other compositions are the same as those of Example No. 4. The resulting paint composition was labeled as Example No. 5.

Example No. 6

Instead of the water emulsion of Example No. 4, an emulsion was used which was obtained by mixing a water emulsion, containing a styrene-butadiene resin (SBR and Tg: 5° C.) whose gel ratio was 60% and butadiene content was 35% in an amount of 55% by weight, in an amount of 80 parts by weight as a granular resin with another water emulsion of a styrene-acrylic ester copolymer whose gel ratio was 8% and Tg was 25° C. in an amount of 20 parts by weight as another granular resin. The other compositions are the same as those of Example No. 4. The resulting paint composition was labeled as Example No. 6.

Example No. 7

The compounding proportions of the water emulsion particles of Example No. 4 were changed so that an emulsion was used which was obtained by mixing a water emulsion, containing a styrene-butadiene resin (SBR and Tg: 5° C.) whose gel ratio was 60% and butadiene content was 35% in an amount of 55% by weight, in an amount of 50 parts by weight as a granular resin with another water emulsion of a styrene-acrylic ester copolymer whose gel ratio was 8% and Tg was 25° C. in an amount of 50 parts by weight as another granular resin. The other compositions are the same as those of Example No. 4. The resulting paint composition was labeled as Example No. 7.

Example No. 8

Instead of the water emulsion of Example No. 4, an emulsion was used which was obtained by mixing a water emulsion, containing a styrene-butadiene resin (SBR and Tg: 5° C.) whose gel ratio was 80% and butadiene content was 35% in an amount of 55% by weight, in an amount of 80 parts by weight as a granular resin with another water emulsion of a styrene-acrylic ester copolymer whose gel ratio was 12% and Tg was 55° C. in an amount of 20 parts by weight as another granular resin. The other compositions are the same as those of Example No. 4. The resulting paint composition was labeled as Example No. 8.

Example No. 9

Instead of the water emulsion of Example No. 4, an emulsion was used which was obtained by mixing a water emulsion, containing a styrene-butadiene resin (SBR and Tg: 5° C.) whose gel ratio was 80% and butadiene content was 35o in an amount of 55% by weight, in an amount of 90 parts by weight as a granular resin with another water emulsion of a styrene-acrylic ester copolymer whose gel ratio was 10% and Tg was 50° C. in an amount of 10 parts by weight as another granular resin. The other compositions are the same as those of Example No. 4. The resulting paint composition was labeled as Example No. 9.

Example No. 10

Instead of the water emulsion of Example No. 4, an emulsion was used which was obtained by mixing a water emulsion, containing a styrene-butadiene resin (SBR and Tg: 5° C.) whose gel ratio was 60% and butadiene content was 35% in an amount of 55% by weight, in an amount of 40 parts by weight as a granular resin with another water emulsion of a styrene-acrylic ester copolymer whose gel ratio was 10% and Tg was 50° C. in an amount of 60 parts by weight as another granular resin. The other compositions are the same as those of Example No. 4. The resulting paint composition was labeled as Example No. 10.

Comparative Example No. 9

An emulsion was used which was obtained by mixing a water emulsion, containing a styrene-butadiene resin (SBR and Tg: 5° C.) whose gel ratio was 90% and butadiene content was 35% in an amount of 55% by weight, in an amount of 80 parts by weight as a granular resin with another water emulsion of a styrene-acrylic ester copolymer whose gel ratio was 8% and Tg was 25° C. in an amount of 20 parts by weight as another granular resin. The other compositions are the same as those of Example No. 4. The resulting paint composition was labeled as Comparative Example No. 9.

Comparative Example No. 10

The compounding proportions of the water emulsion particles of Comparative Example No. 9 were changed so that an emulsion was used which was obtained by mixing a water emulsion, containing a styrene-butadiene copolymer (SBR and Tg: 5° C.) whose gel ratio was 90% and butadiene content was 35% in an amount of 55% by weight, in an amount of 50 parts by weight as a granular resin with another water emulsion of a styrene-acrylic ester copolymer whose gel ratio was 8% and Tg was 25° C. in an amount of 50 parts by weight as another granular resin. The other compositions are the same as those of Example No. 4. The resulting paint composition was labeled as Comparative Example No. 10.

Table 3 sets forth the compounding composition of the 23 respective paint compositions of aforementioned Example No. 4 through Example No. 10 as well as Comparative Example Nos. 9 and 10. After the respective paint compositions were mixed by a high-speed stirrer to disperse, they were stirred to defoam, and were used as paints for application.

The paints were applied to a 70×150×0.8 (mm) electrodeposition-coated steel plate so as to be 50×150×3.0 (mm), immediately after the application, they were put in a drying oven, whose temperature was controlled at 140° C., for 30 minutes to carry out baking and drying. After the drying, the appearance of the paint films was observed, and the paint films free from cracks and swelling were regarded as being passed (O). Table 3 sets forth the results.

As recited in Table 3, in Example Nos. 4 through 7 in which a water emulsion whose glass transition temperature (Tg) was 5° C. and gel ratio was from 80 to 60% was mixed in an amount of from 80 to 50 parts by weight as a granular resin with another water emulsion whose glass transition point (Tg) was from 25° C. to 50° C. in an amount of from 20 to 50 parts by weight as another granular resin, normal paint films which had such a heavy thickness as 8.0 mm could be formed when paint films in which the inorganic filler was compounded in an amount of 400 parts by weight with respect to 100 parts by weight of the granular resins were baked at such a high temperature as 140° C.

In Example No. 8 in which a water emulsion whose glass transition temperature (Tg) was 5° C. and gel ratio was 80% was mixed in an amount of 80 parts by weight as a granular resin with another water emulsion whose glass transition temperature (Tg) was 55° C. in an amount of 20 parts by weight as another granular resin, a paint film which had a thickness of 5.0 mm could be obtained, but cracks occurred in paint films which had such a heavy thickness as 6.0 mm or more.

In Example No. 9 in which a water emulsion whose glass transition temperature (Tg) was 5° C. and gel ratio was 80% was mixed in an amount of 90 parts by weight as a granular resin with another water emulsion whose glass transition temperature (Tg) was 50° C. in an amount of 10 parts by weight as another granular resin, a paint film which had a thickness of 6.0 mm could be obtained, but swelling occurred in paint films which had such a heavy thickness as 7.0 mm or more.

In Example No. 10 in which a water emulsion whose glass transition temperature (Tg) was 5° C. and gel ratio was 60% was mixed in an amount of 40 parts by weight as a granular resin with another water emulsion whose glass transition temperature (Tg) was 50° C. in an amount of 60 parts by weight as another granular resin, a paint film which had a thickness of 5.0 mm could be obtained, but cracks occurred in paint films which had such a heavy thickness as 6.0 mm or more.

From the facts, when the mixing amount of the granular resin of the water emulsion whose glass transition temperature (Tg) falls in a range of from 25 to 50° C. exceeds 500 of all the water-emulsion granular resins, or when the water emulsion whose glass transition temperature (Tg) exceeds 50° C. is the granular resin, paint films become brittle because the formation of paint films is slow in baking and drying, and accordingly cracks occur. Moreover, when it is less than 20% of all the water-emulsion granular resins, or when the glass transition temperature (Tg) is less than 25° C., the action of promoting the evaporation of water is insufficient in the initial period of baking and drying, and consequently swelling occurs in paint films which have such a heavy thickness as 8.0 mm.

Moreover, on the samples from which the normal paint films were obtained, the damping property (loss factor) by means of a cantilever method was measured. As for the measurement of the damping property (loss factor), they were applied to a 10×220×0.8 (mm) steel plate so as to be 10×200×3.0 in superficial density (after being dried), and were put in a drying oven, whose temperature was controlled at 140° C., for 30 minutes to carry out baking and drying. After drying, the coated plates were used as test plates for assessment, and were examined by a cantilever method so as to calculate the loss factor at the secondary resonance point by a half-width method. Table 3 sets forth the results together with the measurement conditions. Excepting the case where the paint film of Example No. 10 was examined at a measurement temperature of 20° C., since all of the paint films exhibited a loss factor of 0.1 or more, it is understood that they were good as a paint film and could secure stable performance at a measurement temperature of from 20° C. to 40° C.

TABLE 1

|  | Gel Ratio | Ex. No. 1 | | Ex. No. 2 | | Ex. No. 3 | | Comp. Ex. No. 1 | | Comp. Ex. No. 2 | |
| --- | --- | --- | --- | --- | --- | --- | --- | --- | --- | --- | --- |
| Water Emulsion Resin (Styrene-Butadiene Copolymer) Tg: 5° C. (Resinous Content, 55%) | 90% 80% 70% 60% 50% | 100* | | 100* | | 100* | | 100* | | 100* | |
| Calcium Carbonate | | 400 | 200 | 400 | 200 | 400 | 200 | 400 | 200 | 400 | 200 |
| Additives (Dispersing Agent & Running Inhibitor Agent) | | 20 | | 20 | | 20 | | 20 | | 20 | |
| State of Paint Film after Baking and Drying** | Dry 3.0 mm | ○ | ○ | ○ | ○ | ○ | ○ | X (Swollen) | X (Swollen) | X (Swollen) | X (Swollen) |
| | Dry 4.0 mm | ○ | ○ | ○ | ○ | ○ | ○ | — | — | — | — |
| | Dry 5.0 mm | ○ | ○ | ○ | ○ | ○ | ○ | X (Cracked) | X (Cracked) | X (Swollen) | X (Swollen) |
| | Dry 6.0 mm | ○ | ○ | ○ | ○ | ○ | ○ | — | — | — | — |
| | Dry 7.0 mm | X (Cracked) | X (Cracked) | X (Cracked) | X (Swollen) | X (Swollen) | X (Swollen) | X (Cracked) | X (Cracked) | X (Swollen) | X (Swollen) |
| | Dry 8.0 mm | X (Cracked) | X (Cracked) | X (Cracked) | X (Swollen) | X (Swollen) | X (Swollen) | — | — | — | — |
| Damping Property (Loss Factor)*** | Measurement Temp. 20° C. | 0.15 | 0.14 | 0.14 | 0.15 | 0.14 | 0.15 | — | — | — | — |
| | Measurement Temp. 30° C. | 0.14 | 0.12 | 0.14 | 0.14 | 0.15 | 0.13 | — | — | — | — |
| | Measurement Temp. 40° C. | 0.11 | 0.10 | 0.11 | 0.10 | 0.11 | 0.11 | — | — | — | — |

*Resinous Content (Parts by Weight)
**State of Pant Film: ○, Free from Cracks and Swelling & X, Cracks or Swelling Occurred
***Measurement Conditions: Cantilever Method, Substrate 0.8 t & Superficial Density 3.0 kg/m²

TABLE 2

|  | Gel Ratio | Comp. Ex. No. 3 | Comp. Ex. No. 4 | Comp. Ex. No. 5 | Comp. Ex. No. 6 |
| --- | --- | --- | --- | --- | --- |
| Water Emulsion Resin (Styrene-Butadiene Copolymer) (Tg: −5° C., Resinous Content: 55%) | 90% 80% 60% | 100* | 100* | 100* | |
| Water Emulsion Resin (Styrene-Butadiene | 80% 60% 50% | | | | 100* |

TABLE 2-continued

| | | | | | | | | | |
|---|---|---|---|---|---|---|---|---|---|
| Copolymer) (Tg: 30° C., Resinous Content: 55%) | | | | | | | | | |
| Calcium Carbonate | | 400 | 200 | 400 | 200 | 400 | 200 | 400 | 200 |
| Additives (Dispersing Agent & Running Inhibitor Agent) | | 20 | | 20 | | 20 | | 20 | |
| State of Paint Film after Baking and Drying** | Dry 3.0 mm | X (Cracked) | X (Swollen) | ○ | ○ | ○ | ○ | X (Swollen) | X (Swollen) |
| | Dry 4.0 mm | X (Cracked) | X (Swollen) | ○ | X (Swollen) | ○ | X (Swollen) | X (Cracked) | X (Cracked) |
| | Dry 5.0 mm | X (Cracked & Swollen) | X (Cracked & Swollen) | X (Swollen) | X (Swollen) | X (Swollen) | X (Swollen) | X (Cracked) | X (Cracked) |
| | Dry 6.0 mm | X (Cracked & Swollen) | X (Cracked & Swollen) | X (Swollen) | X (Swollen) | X (Swollen) | X (Swollen) | X (Cracked) | X (Cracked) |
| | Dry 7.0 mm | X (Cracked & Swollen) | X (Cracked & Swollen) | X (Cracked & Swollen) | X (Cracked & Swollen) | X (Swollen) | X (Swollen) | — | — |
| | Dry 8.0 mm | X (Cracked & Swollen) | X Cracked & Swollen) | X (Cracked & Swollen) | X (Cracked & Swollen) | X (Swollen) | X (Swollen) | — | — |
| Damping Property (Loss Factor)*** | Measurement Temp. 20° C. | — | — | 0.14 | 0.14 | 0.14 | 0.13 | — | — |
| | Measurement Temp. 30° C. | — | — | 0.09 | 0.08 | 0.10 | 0.08 | — | — |
| | Measurement Temp. 40° C. | — | — | 0.04 | 0.03 | 0.05 | 0.04 | — | — |

| | | Gel Ratio | Comp. Ex. No. 7 | Comp. Ex. No. 8 |
|---|---|---|---|---|
| Water Emulsion Resin (Styrene-Butadiene Copolymer) (Tg: −5° C., Resinous Content: 55%) | | 90% 80% 60% | | |
| Water Emulsion Resin (Styrene-Butadiene Copolymer) (Tg: 30° C., Resinous Content: 55%) | | 80% 60% 50% | 100* | 100* |
| Calcium Carbonate | | | 400 200 | 400 200 |
| Additives (Dispersing Agent & Running Inhibitor Agent) | | | 20 | 20 |
| State of Paint Film after Baking and Drying** | Dry 3.0 mm | | X (Swollen)  X (Swollen) | X (Swollen)  ○ |
| | Dry 4.0 mm | | X (Cracked)  X (Cracked) | X (Cracked & Swollen)  X (Cracked & Swollen) |
| | Dry 5.0 mm | | X (Cracked)  X (Cracked) | X (Cracked & Swollen)  X (Cracked & Swollen) |
| | Dry 6.0 mm | | X (Cracked)  X (Cracked) | X (Cracked & Swollen)  X (Cracked & Swollen) |
| | Dry 7.0 mm | | — — | — — |

TABLE 2-continued

|  |  |  |  |  |  |  |
|---|---|---|---|---|---|---|
|  | Damping Property (Loss Factor)*** | Dry 8.0 mm Measurement Temp. 20° C. | — | — | — | 0.06 |
|  |  | Measurement Temp. 30° C. | — | — | — | 0.09 |
|  |  | Measurement Temp. 40° C. | — | — | — | 0.15 |

*Resinous Content (Parts by Weight)
**State of Pant Film: ○, Free from Cracks and Swelling & X, Cracks or Swelling Occurred

TABLE 3

|  |  | Ex. No. 4 | Ex. No. 5 | Ex. No. 6 | Ex. No. 7 | Ex. No. 8 | Ex. No. 9 | Ex. No. 10 | Comp. Ex. 9 | Comp. No. 10 |
|---|---|---|---|---|---|---|---|---|---|---|
| Styrene-Butadiene Copolymer Tg: 5° C. (Resinous Content, 55%) | Gel Ratio, 90% |  |  |  |  |  |  |  |  |  |
|  | Gel Ratio, 80% | 80* |  |  |  | 80* | 90* |  | 80* |  |
|  | Gel Ratio, 60% |  | 50* | 80* | 50* |  |  | 40* |  | 50* |
| Styrene-Acrylic ester Copolymer Gel Ratio, 10% (Resinous Content, 52%) | Glass Transition Temp. (Tg), 25° C. |  |  | 20* | 50* |  |  |  | 20* | 50* |
|  | Glass Transition Temp. (Tg), 50° C. | 20* | 50* |  |  |  | 10* | 60* |  |  |
|  | Glass Transition Temp. (Tg), 55° C. |  |  |  |  | 20* |  |  |  |  |
|  | Calcium Carbonate | 400 | 400 | 400 | 400 | 400 | 400 | 400 | 400 | 400 |
|  | Additives (Dispersing Agent & Running Inhibitor Agent) | 20 | 20 | 20 | 20 | 20 | 20 | 20 | 20 | 20 |
| State of Paint Film after Baking and Drying** | Dry 3.0 mm | ○ | ○ | ○ | ○ | ○ | ○ | ○ | X (Cracked) | X (Cracked) |
|  | Dry 4.0 mm | ○ | ○ | ○ | ○ | ○ | ○ | ○ | X (Cracked) | X (Cracked) |
|  | Dry 5.0 mm | ○ | ○ | ○ | ○ | ○ | ○ | ○ | X (Cracked) | X (Cracked) |
|  | Dry 6.0 mm | ○ | ○ | ○ | ○ | X (Cracked) | ○ | X (Cracked) | X (Cracked) | X (Cracked) |
|  | Dry 7.0 mm | ○ | ○ | ○ | ○ | X (Cracked) | X (Swollen) | X (Cracked) | X (Cracked) | X (Cracked) |
|  | Dry 8.0 mm | ○ | ○ | ○ | ○ | X (Cracked) | X (Swollen) | X (Cracked) | X (Cracked) | X (Cracked) |
| Damping Property (Loss Factor)*** | Measurement Temp. 20° C. | 0.13 | 0.12 | 0.14 | 0.11 | 0.12 | 0.15 | 0.09 | — | — |
|  | Measurement Temp. 30° C. | 0.17 | 0.15 | 0.18 | 0.14 | 0.16 | 0.15 | 0.12 | — | — |
|  | Measurement Temp. 40° C. | 0.15 | 0.18 | 0.14 | 0.17 | 0.15 | 0.12 | 0.19 | — | — |

*Resinous Content (Parts by Weight)
**State of Pant Film: ○, Free from Cracks and Swelling & X, Cracks or Swelling Occurred
***Measurement Conditions: Cantilever Method, Substrate 0.8 t & Superficial Density 3.0 kg/m$^2$

The invention claimed is:

1. A baking-drying water damping paint composition, comprising:

a water emulsion including at least one first granular resin selected from the group consisting of styrene-butadiene copolymers whose glass transition temperature is from more than 0 to less than 20° C. and gel ratio is from 60 to 80%, and at least one second granular resin of styrene-butadiene copolymers whose glass transition temperature is from 25 to 60° C.; and an inorganic filler in an amount of 200 parts by weight or more with respect to the sum of said first granular resin and said second granular resin taken as 100 parts by weight.

2. The baking-drying water damping paint composition set forth in claim 1, wherein a drying temperature of a paint film falls in a range of from 70 to 160° C.

3. The baking-drying water damping paint composition set forth in claim 1 comprising said inorganic filler in an amount of 200 parts by weight or more to 600 parts by weight or less with respect to the sum of said first granular resin and said second granular resin taken as 100 parts by weight.

4. The baking-drying water damping paint composition set forth in claim 1, wherein said inorganic filler is at least one member selected from the group consisting of calcium carbonate, talc, diatomaceous earth, barium sulfate, zeolite, magnesium carbonate and mica.

5. The baking-drying water damping paint composition set forth in claim 4, wherein said inorganic filler has an average particle diameter of 50 μm or less.

6. The baking-drying water damping paint composition set forth in claim 1, wherein said inorganic filler includes inorganic short fibers whose fibrous length is from 100 μm to 1 mm.

7. The baking-drying water damping paint composition set forth in claim 1, wherein said first granular resin is included in an amount of from 40 to 85 parts by weight with respect to the sum of said first granular resin and said second granular resin taken as 100 parts by weight.

8. The baking-drying water damping paint composition set forth in claim 1, wherein said first granular resin is included in an amount of from 50 to 85 parts by weight with respect to the sum of said first granular resin and said second granular resin taken as 100 parts by weight.

9. The baking-drying water damping paint composition of claim 1, which is bakeable and dryable in a single step.

* * * * *